(12) United States Patent
Brandt et al.

(10) Patent No.: US 8,558,694 B2
(45) Date of Patent: Oct. 15, 2013

(54) ASSET MANAGEMENT FOR INFORMATION TECHNOLOGY RESOURCES

(75) Inventors: Scott A. Brandt, Dubuque, IA (US);
Randy S. Johnson, O'Fallon, MO (US);
Tedrick N. Northway, Wood River, IL (US); Rick Voorhees, Galena, IL (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/898,950

(22) Filed: Oct. 6, 2010

(65) Prior Publication Data

US 2012/0087301 A1  Apr. 12, 2012

(51) Int. Cl.
*G08B 1/08* (2006.01)

(52) U.S. Cl.
USPC .............. 340/539.13; 340/568.1; 340/539.2

(58) Field of Classification Search
USPC .................................................. 340/539.13
See application file for complete search history.

(56) References Cited

U.S. PATENT DOCUMENTS

| | | |
|---|---|---|
| 5,686,888 A | 11/1997 | Welles et al. |
| 5,774,876 A | 6/1998 | Woolley et al. |
| 5,959,568 A | 9/1999 | Woolley |
| 6,108,524 A | 8/2000 | Hershey et al. |
| 6,144,301 A | 11/2000 | Frieden |
| 6,600,418 B2 | 7/2003 | Francis et al. |
| 6,643,586 B2 | 11/2003 | Allen et al. |
| 6,731,908 B2 | 5/2004 | Berliner et al. |
| 6,738,628 B1 | 5/2004 | McCall et al. |
| 6,977,612 B1 | 12/2005 | Bennett |
| 7,019,663 B2 | 3/2006 | Sharony |
| 7,027,808 B2 | 4/2006 | Wesby |
| 7,102,510 B2 | 9/2006 | Boling et al. |
| 7,116,230 B2 | 10/2006 | Klowak |
| 7,151,950 B1 * | 12/2006 | Oyang et al. ................ 455/556.1 |
| 7,180,422 B2 | 2/2007 | Milenkovic et al. |
| 7,448,165 B2 * | 11/2008 | Woods et al. .................... 49/324 |
| 7,496,201 B2 * | 2/2009 | Westin .......................... 380/258 |
| 7,558,564 B2 | 7/2009 | Wesby |
| 2002/0152223 A1 | 10/2002 | Kerr, Sr. |
| 2004/0024644 A1 | 2/2004 | Gui et al. |
| 2006/0183450 A1 * | 8/2006 | Cameron .................... 455/226.2 |
| 2006/0235831 A1 * | 10/2006 | Adinolfi et al. .................... 707/3 |
| 2008/0121690 A1 | 5/2008 | Carani et al. |
| 2008/0263300 A1 * | 10/2008 | Poll .............................. 711/163 |
| 2009/0012914 A1 * | 1/2009 | Burchfield et al. ........... 705/400 |

(Continued)

OTHER PUBLICATIONS http://en.wikipedia.org/wiki/Triangulation.

(Continued)

*Primary Examiner* — Kerri McNally
(74) *Attorney, Agent, or Firm* — Ojanen Law Offices; Karuna Ojanen (57) ABSTRACT

A method to identify information technology resources whereby a locator device is inserted into a communication port of each information technology resource, such as a computers, router, cable endpoints, etc. When activated, the device passively receives wireless RF transmissions from broadcast units in the vicinity while actively receiving and storing configuration and other predetermined information from the resource. The device can calculate the exact position of the information technology resource and store the location in memory. The location and the identifying data of the information technology resource can be used in an asset management database, to locate a lost or missing resource, or can be used for billing for service level agreements. The method and device herein is particularly useful in secure facilities.

22 Claims, 7 Drawing Sheets

(56) References Cited

U.S. PATENT DOCUMENTS

| | | | |
|---|---|---|---|
| 2009/0015382 A1* | 1/2009 | Greefkes | 340/10.2 |
| 2009/0189767 A1 | 7/2009 | Primm et al. | |
| 2010/0077115 A1* | 3/2010 | Rofougaran | 710/63 |
| 2011/0037565 A1* | 2/2011 | Skirble et al. | 340/8.1 |
| 2011/0084666 A1* | 4/2011 | Dandekar et al. | 320/137 |

OTHER PUBLICATIONS http://en.wikipedia.org/wiki/Multilateration.
http://www.rp-photonics.com/time_of_flight_measurements.html.
http://www.rp-photonics.com/phase_shift_method_for_distance_measurements.html.

* cited by examiner

ASSET MANAGEMENT FOR INFORMATION TECHNOLOGY RESOURCES

BACKGROUND

The present application relates to a method, a device, computer program product and a business method to conduct an inventory of electronic and/or IT resources such as servers, workstations, other hardware and cabling endpoints in a localized facility with a secure locator device and triangulation location methods.

The ability to accurately track, maintain, or locate information technology (IT) assets continues to plague the industry. IT assets such as hardware may be incorrectly entered into an asset database or may be moved without updating the asset database and cannot be physically found. These lost assets often result in lost revenue, missed contracted service level agreements, security issues, noncompliance with private and government regulations, and lost time spent in locating missing assets. The issue in locating assets is often that the asset database and reference diagrams were incorrectly loaded while performing the initial wall-to-wall inventory, performing inventory audits, or at the conclusion of an install, move, add, change (IMAC) activity. The asset database and the reference diagrams may not have been updated or relevant information about the asset was entered incorrectly or is missing.

The private sector as well as government accounts require a complete accounting of assets and may also require sensitive data associated with an asset supporting the account. Capturing this information is difficult if the asset(s) data were not correctly or fully captured, as stated above. The recovery steps to find missing or misidentified assets are generally handed off to onsite asset management personnel who are often specialized engineers to locate workstations and/or servers which are or have been mislabeled on the outside of the computer or incorrectly named or have other kinds of errors that occurred when recording the assets although the asset is often in plain sight. This approach to asset resolution is costly and very inefficient. It is not unheard of for such an effort to take days to find just one missing asset. Even though an asset management engineer may be able to logon remotely to an asset and obtain the asset information, this method still fails in capturing the physical location of the asset. Pinging the device fails to locate and provide the spatial XYZ coordinates respective to the location in the building or room in which the asset is physically located. The physical location and verification of these electronic hardware assets may be required for audit accounting purposes, government regulations, and install move add change requests. Most servers are in racks, inches away from each other, the presence and location of which may be missed even with the employment of radio frequency identification (RFID) tags. Thus, using the above technologies and methodologies fail. Some facilities, moreover, are secure in that radio frequency (RF) and global positioning system (GPS) signals are blocked, as will be discussed.

SUMMARY

These needs and others are satisfied by a secure device comprising: a connector to transmit and receive data from an electronic and/or information technology resource; a receiver to receive wireless signals; a nonvolatile memory wherein data is received from the electronic and/or information technology resource and wireless signals received by the receiver are stored in the memory. The secure device may further comprise processing logic to determine spatial coordinates of the electronic resource from the signals received by the wireless receiver. The secure device is especially useful when the electronic and/or information technology resource is in a secure facility not receiving emanations from outside the secure facility. The secure device may further have an optical transmitter and receiver to emit radiation and receive reflected radiation from a reference and store the distance from the secure device to the reference, and a gyroscopic level.

Also described herein is a method to receive information from one or more information technology resources, comprising: inserting a locator device into an electronic data connector of the one or more information technology resources and activating the locator device so that the locator device interrogates and receives data from the one or more information technology resource. For each of the one or more information technology resources, the locator device receives wireless signals from at least two different transmitters in the facility of the one or more information technology resource. The locator device then stores the data received from the one or more information technology resource in a nonvolatile memory in the locator device. Processing logic within the locator device may calculate the spatial coordinates of each of the one or more information technology resource from the wireless signals. The locator device may store the wireless signals and/or optical information from a reference in the nonvolatile memory for downloading to a support server for calculation of the spatial coordinates of the information technology resource.

The data received from the one or more information technology resources comprises one or more of the following: name, serial number, type of information technology resource, cost, price, depreciation, firmware, basic input output system data, internet protocol, IP address, install software configuration, intranet protocol.

The locator device is removed from the one or more information technology resource, connected to computer and the information technology resource data and the stored wireless signals for each of the one or more information technology resources is downloaded to the computer. The computer may perform any of the following functions with the downloaded data: calculate the spatial coordinates of each of the one or more information technology resources; create or update an asset database with the information technology resource data and its respective spatial coordinates; create and/or update physical diagrams of a facility in which the information technology resource is located; create and/or update information associated with use of the one or more information technology resources.

The information technology resources may be located in a secure TEMPEST facility that does not receive transient and compromising transmissions and emanations and signals from outside the secure TEMPEST facility.

Also disclosed herein is a computer program product for receiving information technology asset data and location data of the information technology asset, the computer program product comprising a computer readable storage medium having computer readable program code embodied therewith, the computer readable program code comprising: program instructions to receive and store predetermined information from an information technology resource; program instructions to receive wireless signals from one or more wireless transmitters in a same facility in which the information technology resource is located; program instructions to calculate the position of the information technology resource in the same facility from the wireless signals; program instructions to transmit the predetermined information and the position of the information technology resource to one or more computer program applications. There may be additional program instructions to create/update a database of one or more of the information technology resources; create/update physical diagrams of the facility indicating the location of one or more of the information technology resources in the facility, update and manage service level agreements of one or more of the information technology resources in the facility.

Features and advantages will further be described with respect to the following drawings, wherein like number represent like features and/or method steps.

DETAILED DESCRIPTION OF THE INVENTION

Figure 1:
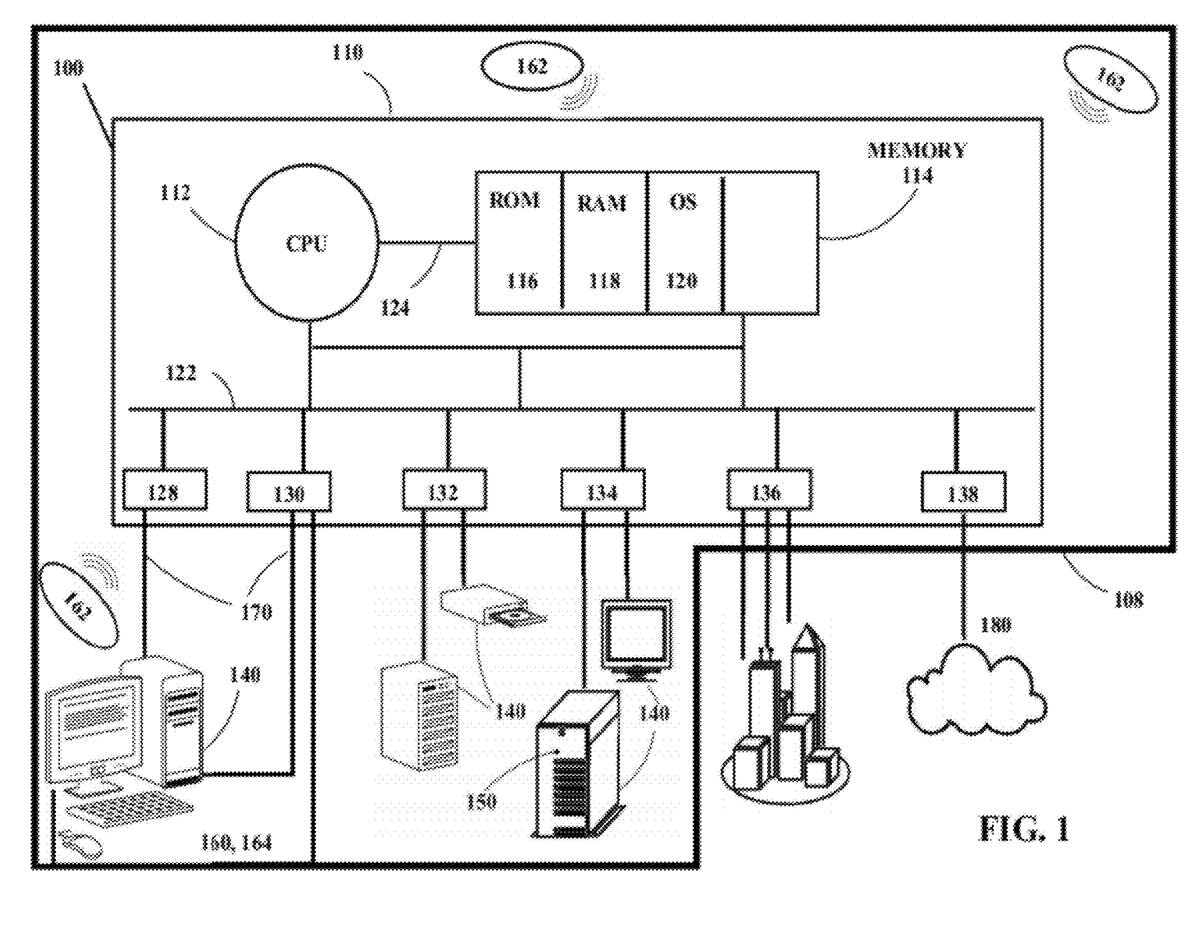
FIG. 1 is a high-level block diagram of a computer network system consistent with an embodiment described herein.

Referring to FIG. 1, shown is a high-level block diagram of a computer network system 100 having a server 110 connected on a network 170, preferably on a secure or encrypted network. The server 110 is preferably physically located in the facility 108. In one embodiment, the facility 108 is a secure TEMPEST-hardened facility that cannot receive any transient or compromising transmissions/emanations or signals from outside the facility, such as satellite communications, electro-magnetic signals, line conductions, acoustic emissions, etc. In other embodiments, the secure facility may be a wholesale, retail, or resale electronic or computer store in a mall or as a stand-alone brick and mortar structure, a warehouse, etc. Computer network system 100 preferably comprises a number of secure networked servers 110, each of which may have one or more central processing units (CPU) 112, memory 114, and various digital, analog, and/or optical interfaces 128-138. CPU 112, memory 114, interfaces 128-138 and various other internal devices capable that communicate with each other via an internal communications bus arrangement 122. CPU 112 is a general-purpose programmable processor executing computer program instructions stored in memory 114. A single CPU 112 is shown in FIG. 1 but it should be understood that some servers 110 have multiple CPUs. CPUs 112 are capable of executing an operating system 120 and various applications. CPUs 112 are also capable of generating, receiving and transmitting the computer program components embodying program instructions to configure a locator device 150 and transmit information to and receive data from the various processing units 110, also referred to as electronic hardware assets, to the locator device 150. Communications bus 122 supports transfer of data, commands and other information between different devices and interfaces; and while shown in simplified form as a single bus, it is typically structured as multiple buses including an internal bus 124 which may connect the CPUs 112 directly with memory 114.

Memory 114 is shown conceptually as a single monolithic entity but it is well known that memory is often arranged in a hierarchy of caches and other memory devices, some or all of which may be integrated into the same semiconductor substrates as the CPUs 112. Memory 114 comprises a read only memory (ROM) 116 that typically stores those portions or programs, routines, modules of the operating system 120 necessary to "boot up" the system. Random-access memory (RAM) 118 devices comprise the main storage of computer 110 as well as any supplemental levels of memory, e.g., cache memories, nonvolatile or backup memories, programmable or flash memories, other read-only memories, etc. RAM 118 is also considered the volatile memory storing programs and data that are executing as well as the operating system 120, and programs and data used by the locator device 150, and other applications, data and programs such as graphical user interfaces, application program interfaces by which the locator device 150 can receive both location and configuration data from the electronic hardware assets in the facility connected to network 170. In addition, memory 114 may be considered to include memory storage physically located elsewhere in server 110, e.g., a cache memory in another processor or other storage capacity used as a virtual memory such as on a mass storage device or on another server 110 coupled to server 110 via a network.

Operating system 120 provides, inter alia, functions such as device interfaces, management of memory pages, management of multiple tasks, etc. as is known in the art. Examples of such operating systems may include Linux, Aix, Unix, Windows-based, Z/os, V/os, OS/400, an Rtos, a handheld operating system, etc. Operating system 120 and other variants of the program instructions in the locator device 150, and other applications, other components, programs, objects, modules, etc. may also execute on one or more servers 110 coupled to server 110 via a network 170, 180, e.g., in a distributed or client-server computing environment, whereby the processing required to implement the functions of a computer program may be allocated to multiple computers 110 over a network 170, 180.

In general, software program instructions of the locator device 150 execute within the application specific integrated circuits 136 within the locator device 150 and/or CPUs 112 to implement the embodiments described herein, whether implemented as part of an operating system or a specific application, component, program, object, module or sequence of instructions may be referred to herein as computer programs or instructions. The locator device 150 typically comprise one or more instructions that are resident at various times in various memory 114 and storage in a device and that, when read and executed by programming logic 136 within the locator device 150 and/or CPUs 112 in the server 110, cause that locator device 150 and server 110 to perform the steps necessary to execute steps or elements embodying the various aspects of the methods and processes described herein.

It should be appreciated that server 110 typically includes suitable analog, digital and optical interfaces 128-138, also considered electronic and/or IT resources 140, between CPUs 112, memory 114 and the others of the attached electronic and/or IT resources. For instance, electronic and/or IT resource server 110 typically receives a number of inputs and outputs (I/O) for communicating information externally although in a TEMPEST secure facility, these I/O will be restricted. For interface with a human database administrator or user, server 110 typically includes one or more user input devices 160, 164, e.g., a keyboard, a mouse, a trackball, a joystick, a touchpad, and/or a microphone, among others, and a visual display monitor or panel, and/or a speaker, telephone, among others. It should be appreciated, however, that some implementations of server 110 do not support direct user input and output. Terminal interface 134 may support the attachment of single or multiple terminals 140 or laptop computers 140, also considered to be electronic and/or IT resources, and may be implemented as one or multiple electronic circuit cards or other units. Data storage preferably comprises a storage server functionally connected to one or more rotating magnetic hard disk drive units, although other types of data storage, including a tape or optical driver, could be used. For additional storage, memory 114 of server 110 may also include one or more computer-readable media storage devices such as a floppy or other removable disk drive, a hard disk drive, a direct access storage device (DASD), an optical drive e.g., a compact disk (CD) drive, a digital video disk (DVD) drive, etc., and/or a tape drive, a flash memory, among others. Other memories may be located on storage, including RAMs or mass storage devices of different servers 110 connected through various networks. In the context herein memory 114 may also be considered nonvolatile or backup memories or a programmable or flash memories, read-only memories, etc., in a device physically located on a different computer, client, server, or other hardware memory device, such as a mass storage device or on another computer coupled to computer via network. Memory 114 may comprise remote archival memory such as one or more rotating magnetic hard disk drive units, a tape or optical driver located within or outside the facility 108. One of skill in the art will further anticipate that one or more interfaces 128-138 may be wireless.

Furthermore, server 110 includes an interface 136, 138 with one or more networks 170, 180 to permit the communication of information with other servers coupled to the network(s) 170, 180. Network interface(s) 136, 138 provides a physical and/or wireless connection for transmission of data to and from a network(s) 170, 180. Network(s) 170, 180 may be the Internet, as well as any smaller self-contained network such as an Intranet, a virtual private network (VPN), a wide area network (WAN), a local area network (LAN), or other internal or external network using, e.g., telephone transmissions lines, satellites, fiber optics, T1 lines, wireless, public cable, etc. and any various available technologies. Communication with computer system 100 may be provided further via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In a TEMPEST secured facility, these interconnections will be restricted and/or encrypted. After all, the purpose of a TEMPEST secure facility is the elimination of compromising emanations and signals.

One of ordinary skill in the art understands that server 110 may be connected to more than one network 170, 180 simultaneously. Server 110 and remote servers 110 may be desktop or personal computers, workstations, a minicomputer, a midrange computer, a mainframe computer, all of which are electronic and/or IT resources. Any number of servers, clients, computers and other microprocessor devices, such as personal handheld computers, personal digital assistants, wireless telephones, etc., all of which are electronic and/or IT resources, which may not necessarily have full information handling capacity as the large mainframe servers, may also be networked through network(s) 170, 180. Still yet, any of the components of the methods and program products shown in the embodiments of FIG. 1 through FIG. 7 could be deployed, managed, serviced by a service provider who creates and maintains inventory of electronic and/or IT resources 140 in a facility.

As will be appreciated by one skilled in the art, one or more of the embodiments described herein may be embodied as a system, method or computer program product. Accordingly, the present invention may take the form of an entirely hardware embodiment, an entirely software embodiment (including components, firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network or the connection may be made to an external computer by, for example, through the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described herein resolve issues of managing and locating electronic and/or IT resources in a localized defined facility. A removable locator device 150 is connected to the electronic and/or IT resources 140 and utilizes location based technologies such as infrared (IR) transmitters and receivers, radio frequencies (RF) transmitters and receivers, cellular communications systems, etc. to determine the spatial location of the electronic and/or IT resource 140 within the facility.

Figure 2:
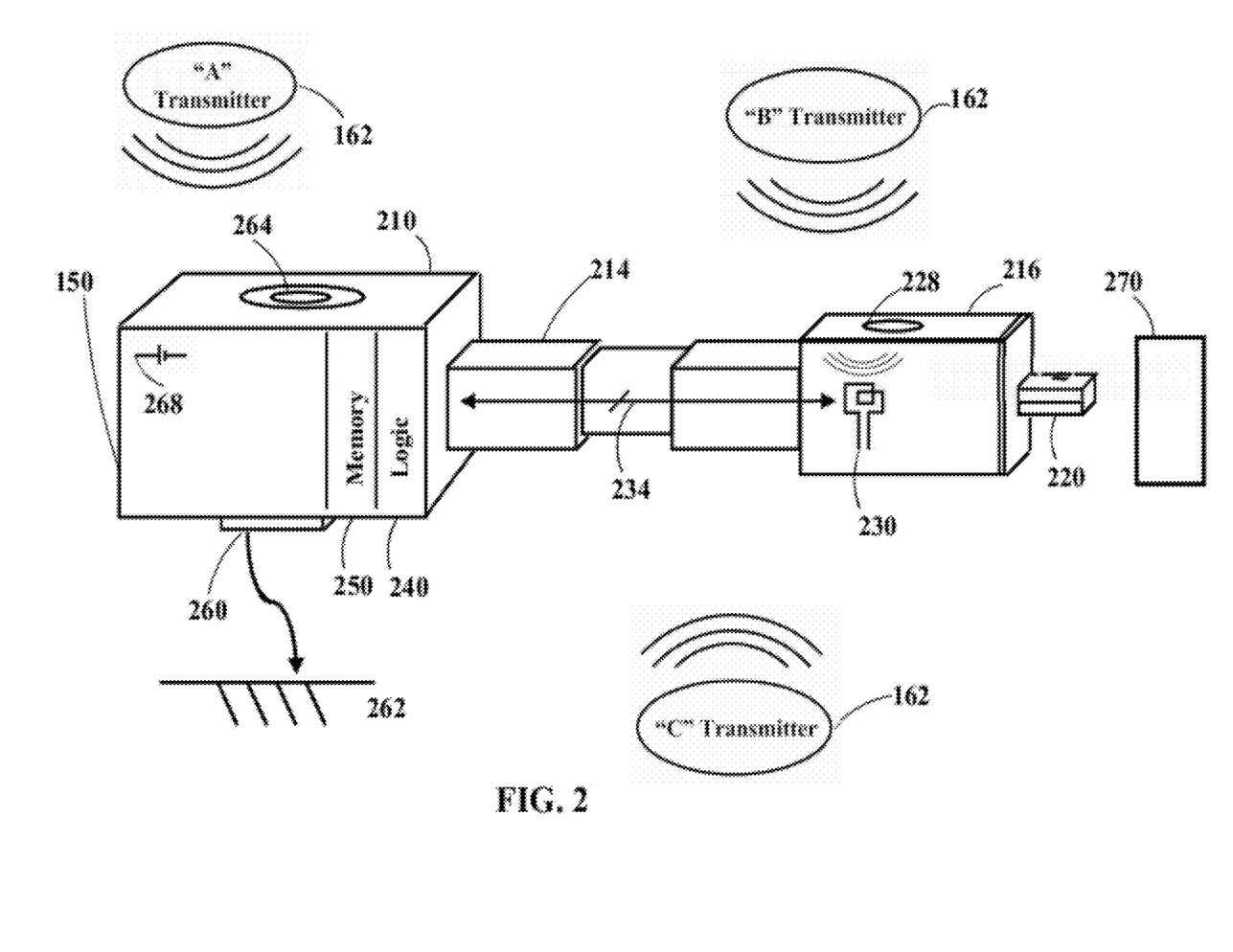
FIG. 2 is a simplified block diagram of a locator device in accordance with an embodiment described herein.

An embodiment of the locator device 150 is shown in FIG. 2. The locator device 150 may contain minimal electronics and memory, as discussed below, by which to obtain information from the various electronic and/or IT resources 140 in the facility, or it may be more complex and the functions described herein to be a portion of the locator device. The electronic locator device 150 is inserted into electronic and/or IT resources, such as servers, laptop computers, routers, modems, switches, displays, controllers, etc. via a USB or other data communication connections and protocols such as USB, RS232, RJ-45 or RJ-11, FIREWIRE (IEEE 1394 High Speed Serial Bus), HDMI adaptors, etc. Additional electronic and/or IT resources to which the locator device can be connected also extends to televisions, smart appliances and any other component with an available data port. As shown in FIG. 2, one embodiment of the locator device 150 has a memory module 210 connected through a telescopic extension 214 to a receiving module 216. Adaptors 270 may be connected to interface between the locator device 150 and the electronic and/or IT resource 140 if the connector 220 does not mate with the connection on the electronic and/or IT resource 140.

The receiving module 216 of the locator device 150 has a USB or other data connector 220 that can be inserted into a corresponding connector, port or cable connected to the electronic and/or IT resource. Preferably the USB or other data connector 220 is rotatable to enable a good connection between the locator device 150 and the electronic and/or IT resource 140 if the connection space is tight or limited and/or in order to receive wireless communication. The receiving portion 216 has a wireless communications receiver or antenna 230 that receives RF, GPS, IR or other frequencies transmitted from broadcasting units 162 whose positions are known within the facility 108. Preferably, there is an on/off switch or activation button 228 to activate the electronics within the locator device 150 to receive wireless communications, interrogate the electronic and/or IT resource 140 to which the locator device 150 is connected, process the data to determine the location of the electronic and/or IT resource, and store the profile and location of the electronic and/or IT resource 140 in a nonvolatile memory 250.

The locator device 150 has a memory module 210 having additional electronic and physical components. It has processing logic 240 by which to calculate the XYZ or polar coordinates of the electronic and/or IT resource 140 from the wireless transmissions received by the wireless receivers 230 and from a laser 260 or other means to obtain or confirm the location. The locator device 150 also has a nonvolatile memory 250 that is capable of storing both the location data and the profile data of the electronic and/or IT resource 140 to which it is connected. The locator device 150 also has a power supply 268 such as a battery to supply voltage to the wireless receivers 230, processing logic 240 and the laser 260. Alternatively, power can be supplied directly from the electronic and/or IT resource 140 through the USB or other connector and the power supply 268 is active only when there is no power available to the electronic and/or IT resource. An electronic or gyroscopic or bubble level 264 may be included with the memory portion 210 to level the locator device 150. The laser 260 sends a beam, preferably an infrared beam, to some known reference 262, such as the floor or height of an instrument rack, which beam is then reflected back to an optical receiver in the locator device 150 and the distance to the reference 262 can be calculated via such calculation methods disclosed in http://www.rp-photonics.com/time_of_flight_measurements.html and http://www.rp-photonics.com/phase_shift_method_for_distance_measurements.html).

Figure 7:
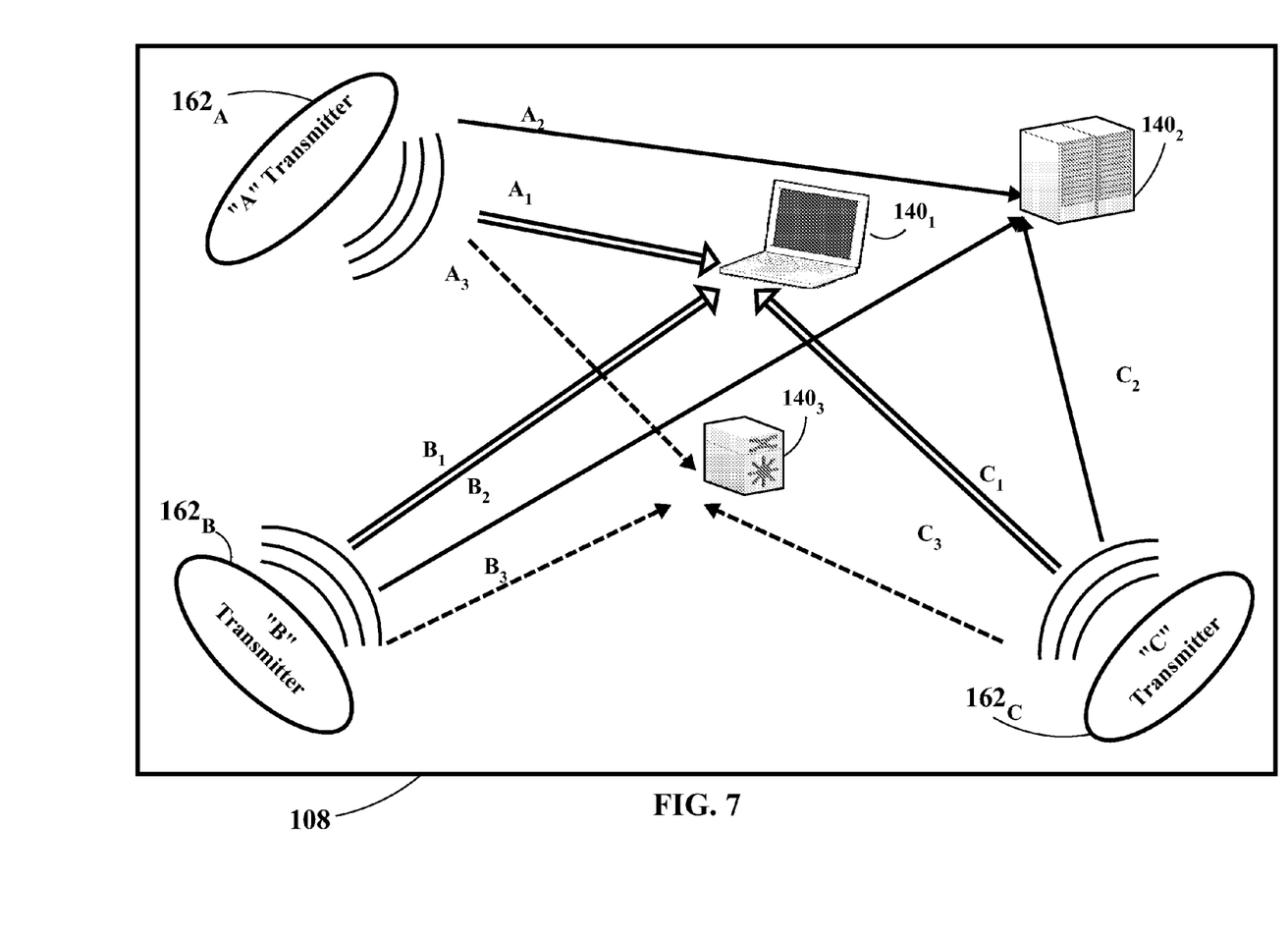
FIG. 7 is a simplified diagram of the locator device, broadcasting units, and electronic and/or IT resources and/or IT in a facility.

The receiver 230 receives transmission from multiple, at least three, broadcast units or transmitters 162 in the facility 108. Broadcast units 162 can be permanently or temporarily located, and each broadcast unit 162 transmits at a different, specified frequency. For each broadcast unit, the frequency and current location are stored into the locator device before starting the inventory process. The distance from each broadcast unit can be calculated using, e.g. U.S. Pat. No. 6,731,908 and then the location can be calculated using triangulation such as described in http://en.wikipedia.org/wiki/Triangulation or multilateralization, described in http://en.wikipedia.org/wiki/Multilateration.

Figure 6:
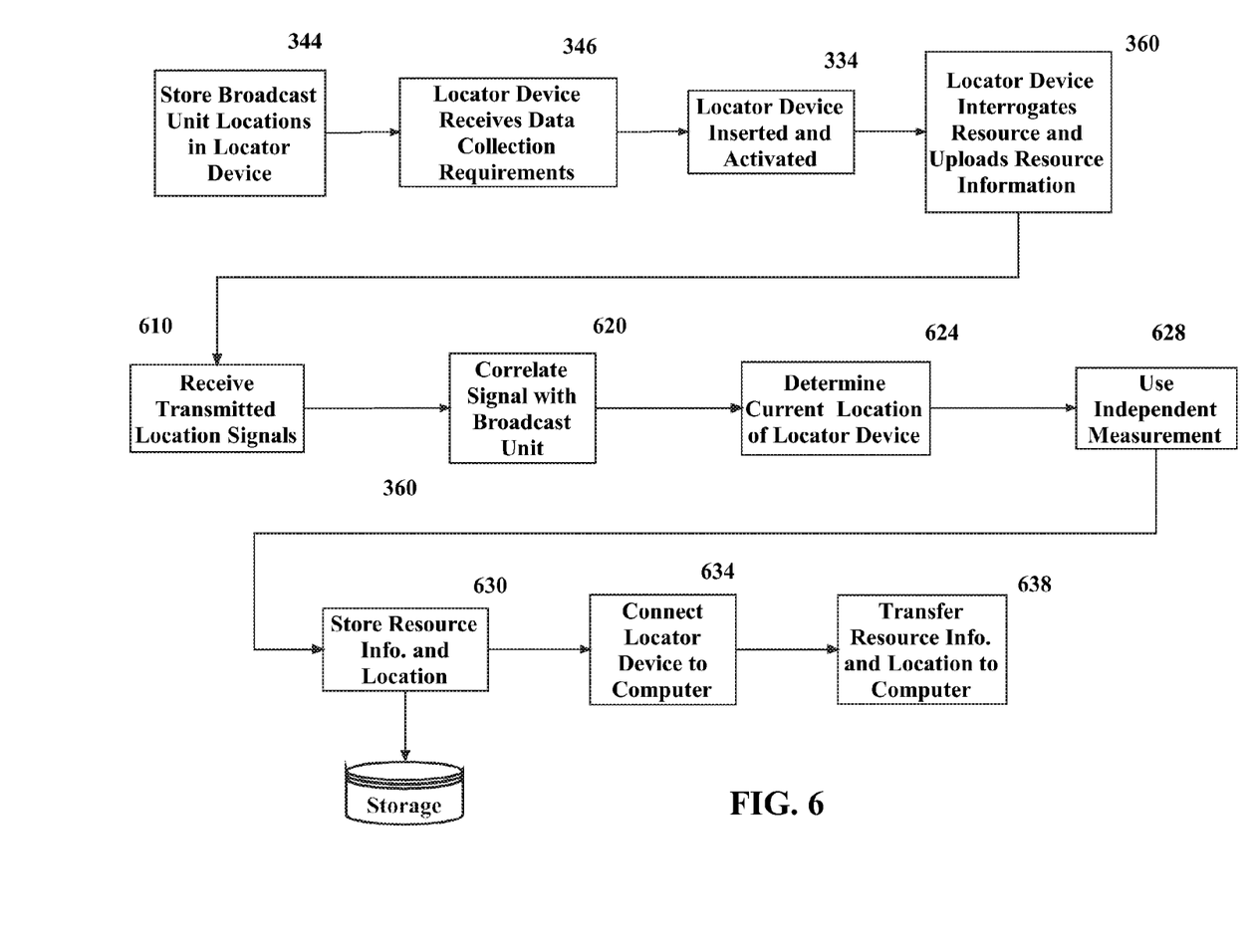
FIG. 6 is a simplified flow diagram of the process steps to use a locator device in accordance with an embodiment described herein.

The signals received from the broadcast units 162 are carried via connections 234 to the memory module 210 and may be stored in memory 250 or the location of the electronic and/or IT resource 140 may be processed through processing logic 240 and stored in memory 250, as further explained with respect to FIG. 6. Simultaneously, the locator device 150 interrogates the electronic and/or IT resource 140, transmits the data via connection 234 to the memory module 210 and stores the configuration of the electronic and/or IT resource 140 in memory 250. The profile information received, transmitted via connections 234 to the memory module 210 may be stored and may include but are not limited to electronic and/or IT resource serial number, electronic and/or IT resource name, applications installed, IP address, and any other relevant data obtained by querying the electronic and/or IT resource.

The locator device 150 collects and stores the electronic and/or IT resource's configuration. The locator device 150 then uses the appropriate location based technology (RF, IR, cell tower) to determine the electronic and/or IT resource's XYZ coordinates in a geo-spatial relationship. For IR, triangulation broadcasting units are used to provide established base points in hardened environments. In addition, the locator device 150 also provides connection to and the gathering of network information from such electronic and/or IT resources 140 as copper or fiber endpoints, e.g., RJ45 or RJ11 ports.

Figure 3:
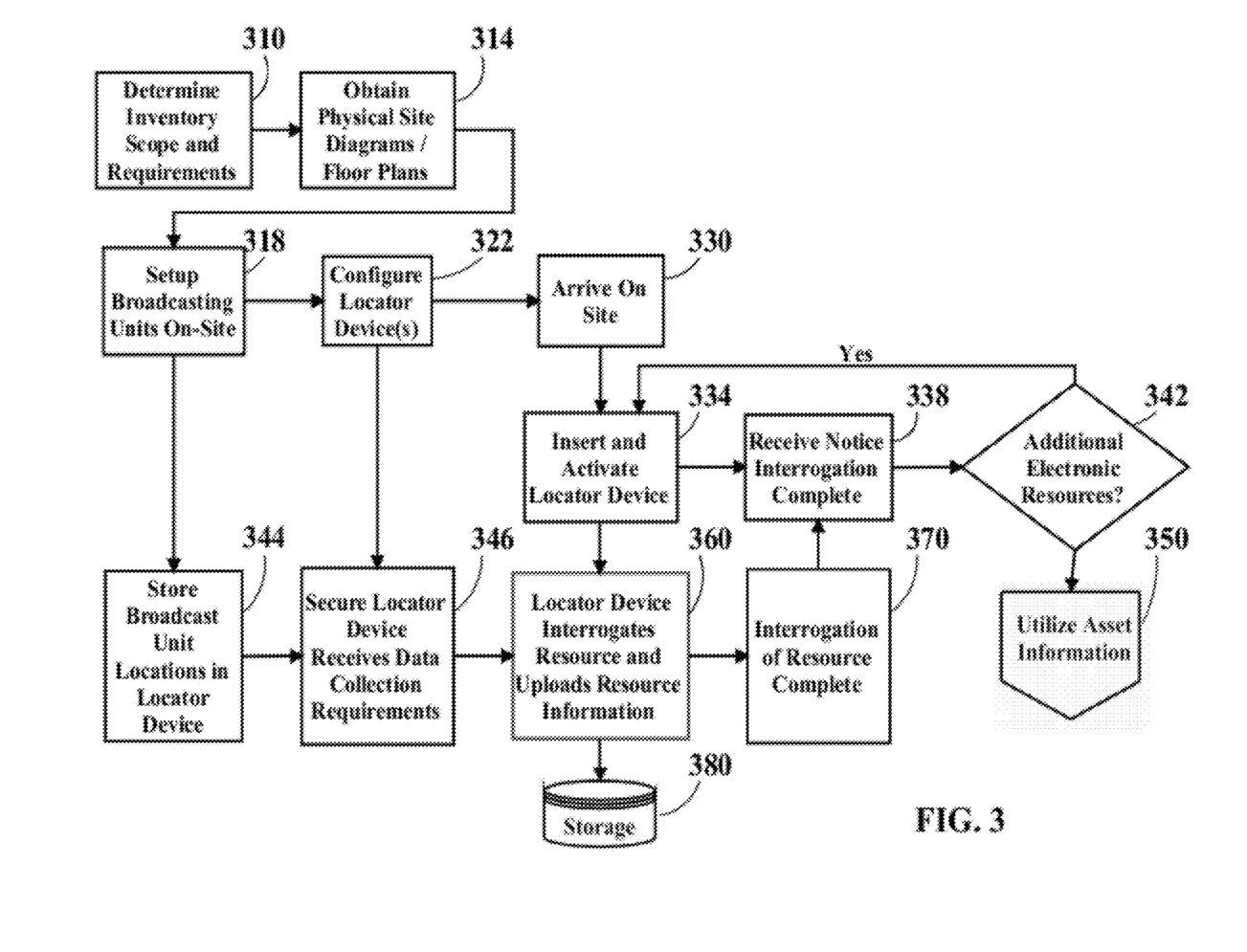
FIG. 3 is a simplified flow diagram of the process steps to use a locator device to take inventory of electronic resources in a facility in accordance with an embodiment described herein. It is suggested that FIG. 3 be printed on the face of the patent.

FIG. 3 is an illustration of the process steps for an initial wall-to-wall inventory preparation. The steps of the initial preparation 302 prior to actually taking an inventory, as in step 310, an asset management team determining the scope and the requirements of the wall-to-wall inventory by identifying the sites and the electronic and/or IT resources 140 to be inventoried. The asset management team also determines the requirements for data collection, such as electronic and/or IT resource 140 type, firmware and basic input/output system (BIOS) information, electronic and/or IT resource 140 name, internet protocol (IP) address, installed software, approximate physical location, cost, price, value, depreciation, etc. In step 314, the inventory team obtains site diagrams or floor plans of the areas within the facility to be inventoried. These site diagrams or floor plans can be hard copy or soft copy. In step 318, broadcasting units are installed or established in predetermined locations in the facility for use in identifying the spatial location of the electronic and/or IT resource 140. In step 322, the locator device 150 is configured to extract the required inventory information. Configuration of the locator device 150 may comprise storing the locations of the broadcast or transmission units 162 in the locator device 150 used when calculating the spatial coordinates of the electronic and/or IT resources 140, as in step 344. The coordinates of the broadcast units 162 are stored in the locator device 150 in step 344 by connecting the locator device 150 to a support server 110 and executing computer program instructions that display in input screen wherein each broadcast unit's 162 locations coordinates and transmission frequency can be entered and stored in the nonvolatile memory of the locator device. Rather than calculating and storing the actual physical coordinates of the electronic and/or IT resources, an alternative embodiment is contemplated wherein the locator device receives and stores the signals and/or the distances. The stored data is uploaded to the support server 110 wherein the xyz spatial coordinates of the broadcast units 162 are calculated using computer program instructions executing in the server 110. In step 346 the locator device 150 receives the data collection requirements of the electronic and/or IT resource 140 as determined by the asset management team in step 310.

The activities 304 performed by the asset management team, which is intended to include people and/or programmed robots, especially in hazardous facilities; thus the asset management team is intended to be inclusive of programmable robots or robotic devices. In step 330, the asset management team arrives on site and prepares to conduct the inventory. The asset management team inserts the locator device 150 into each and every electronic and/or IT resource 140 to be inventoried and activates the locator device, as in step 334.

Upon activation in step 360, the locator device 150 interrogates the electronic and/or IT resource 140 and begins receiving the required information, as defined in step 310 which may include but is not limited to electronic and/or IT resource type, model number, electronic and/or IT resource serial number, IP address, computer name, installed applications, depreciation factors, time in service, cost, pricing, etc. and may include the the XYZ coordinates of the physical location of the electronic and/or IT resource, etc., or the received signals from the broadcast units 162. The data gathered by the locator device 150 in step 360 are stored in memory as in step 380. In step 370, the locator device 150 indicates that the interrogation, the receipt of signals from the broadcast units 162 and/or the location determination are completed. In step 338, the asset management team performing the inventory acknowledges the notice or indication of completion. As the data is being collected, the locator device 150 may display a blinking light indicating that work is in progress.

If, in step 342, there are additional electronic and/or IT resources 140 to be inventoried, the asset management team performing the inventory removes the locator device 150 and inserts it into the interface port of the next electronic and/or IT resource 140, as in step 334. If not, the process continues to utilize the resource data in step 350 and in FIG. 6, to be discussed.

Figure 4:
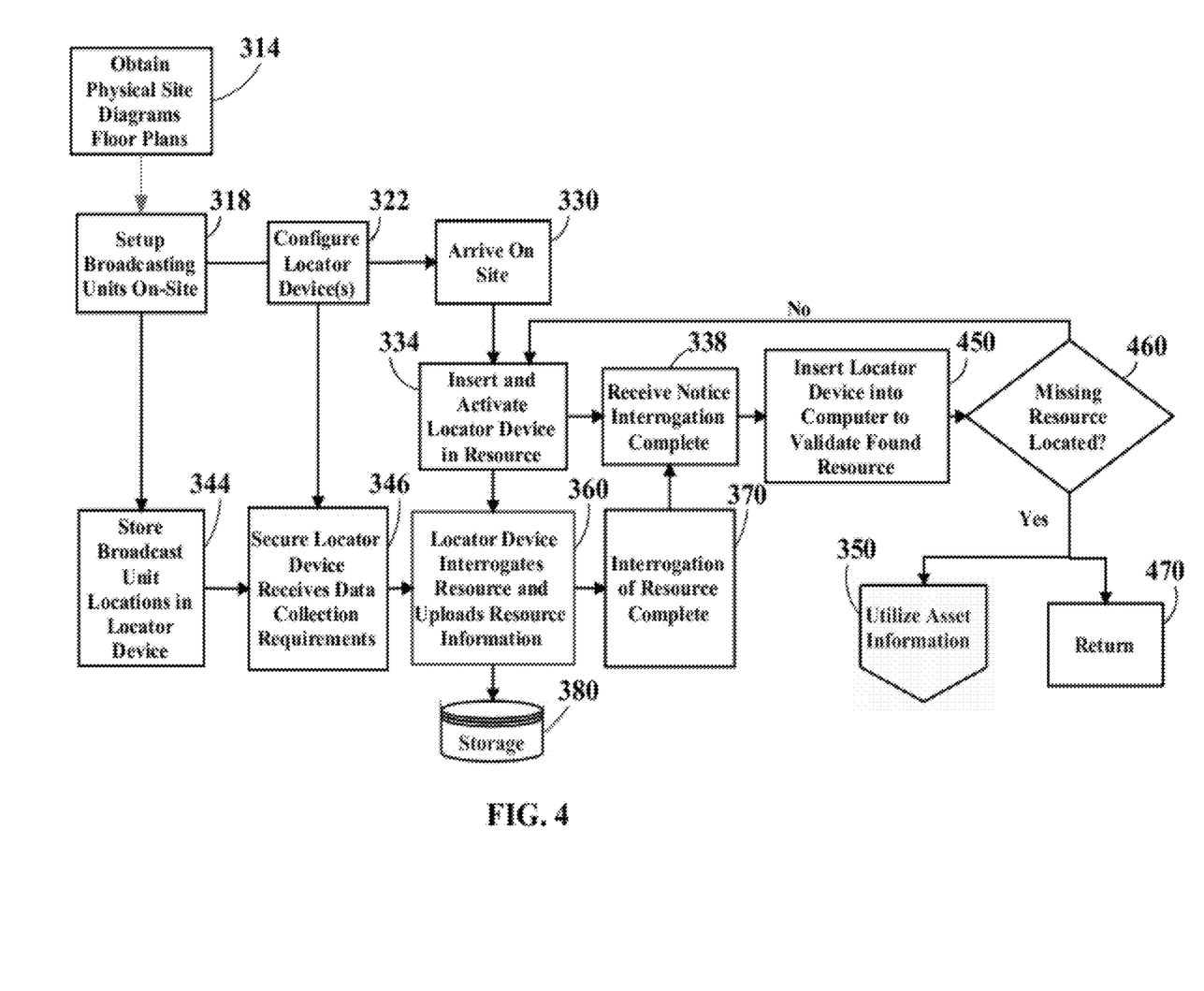
FIG. 4 is a simplified flow diagram of the process steps by which the locator device is used to locate a "missing" electronic resource in a facility in accordance with an embodiment described herein.

FIG. 4 illustrates the process steps whereby the method and the apparatus disclosed herein can be used to locate a missing electronic hardware or software resource in a facility. The process begins with step 314 in FIG. 4 wherein the asset management team obtains the most current site diagrams or floor plans of the facility in which the electronic hardware/software resource 140 is thought to reside. In step 318, if not permanently installed, the broadcast or transmission units are installed in specified locations of the facility to provide triangulation measurements.

In step 322, the asset management team determines which information is required by the locator device 150 to ensure the required electronic and/or IT resource 140 is identified. For instance, there may be several workstations within the secure facility but using the locator device enables quick and accurate evaluation of each electronic hardware and/or IT resource 140 which ultimately confirms the location of the missing electronic hardware and/or IT resource 140. In step 346, the locator device 150 is programmed and stores the requirements for validating and subsequently gathering the information.

Figure 5:
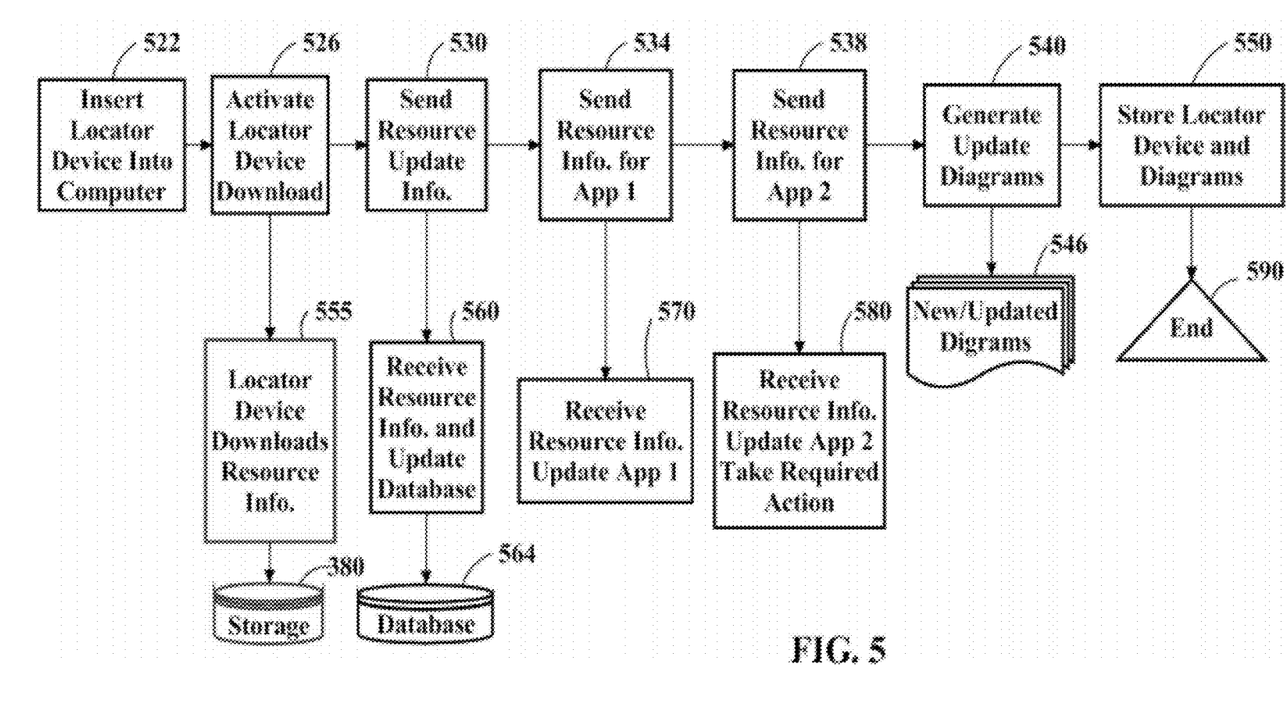
FIG. 5 is a simplified flow diagram of the process steps to how the data acquired by a locator device is used to manage electronic resources in a facility in accordance with an embodiment described herein.

In step 330 of FIG. 5, the asset management team arrives at the facility and prepares to locate the missing electronic hardware/software resource 140. In step 334, the asset management team inserts the locator device into the USB port or other interface connector of the electronic and/or IT resource 140 to be validated and the locator device 150 is activated. The electronic and/or IT resource 140 validates the locator device 150 as being a legitimate device to which it can download its configuration and other information and then downloads the required information to the locator device 150. In step 360, the locator device 150 interrogates and gathers the information programmed in step 346.

After the data and location of the electronic and/or IT resource 140 have been received into the locator device 150, then in step 370, the locator device 150 transmits notification or otherwise indicates that the interrogation is complete. In step 338, the asset management team receives notice that the inventory interrogation is complete and removes the locator device 150 from the electronic and/or IT resource 140. In step 450, the asset management team inserts the locator device 150 into the support server 110 or other processing device that acknowledges the locator device 150 and uploads the data stored in the locator device 150. Optionally, the support server 110 may display the data stored in the locator device 150. In step 460, the target device data is compared against the just-obtained inventory data and if the same, the missing resource has been found. If not, then the asset management team returns to the secure facility and repeat steps 334 through 460.

If, however, all the devices in the facility were interrogated as in the process steps of FIG. 2, then the support server need only retrieve all the stored data from the locator device 150, display it to the asset management team, and determine which, if any, of the electronic hardware/software resources 140 are the missing electronic hardware/software resource 140. Once the missing electronic and/or IT resource 140 has been located, the data is ready to be disseminated to the required databases and to the appropriate personnel who require this information and utilized as in step 350 of FIG. 4 and as further explained in FIG. 6.

FIG. 5 illustrates the process steps of an embodiment of how the inventory and location data stored in the locator device 150 are utilized. In step 522, the locator device 150 is inserted in the port or cable connected to the support server 110 and the support server 110 validates the locator device 150. In step 526, the locator device 150 activates itself or is activated by the support server 110. In step 530, the locator device 150 downloads the data stored in its memory to the support server. The support server receives and stores the gathered electronic and/or IT resource 140 information. In step 530, the support server accesses a stored application to send the required updates to the other management for processing.

The support server responds to the locator device 150 and stores the information which may comprise one or more of the following which listing is not intended to be exhaustive, only representative: resource type, model number, serial number, IP address, computer name, and applications installed and the location of the electronic hardware/software resource 140. In step 60, the electronic and/or IT resource information is received and stored in the asset and/or configuration management databases 564. The asset management team receives the electronic and/or IT resource (s) information and takes the required action to add and/or update the required databases.

In step 534, the electronic and/or IT resource 140 information is distributed for use by various other applications, such as the IT financial department as required. By way of example only, for a business entity charging customers for the resources used, e.g., a data center with five hundred servers, the IT financial department may charge the customer for its use of those servers. When, however, any resource in the facility changes, the charges to the customer will change accordingly. One example of a change might be when a server being used by the customer is changed from two to four central processing units. In step 570, the support server accesses the application to send the financial and use data as required for the type of operations that requires the data gathered. As another example, an install move add change activity may have costs or cost changes associated with it. In step 642d, the support server responds to the application and may transmit the required electronic and/or IT resource 140 information to the team or the computer responsible for IT financial billing. In step 670, the IT finance team or computer receives the required information and takes the required action to perform automated or manual billing.

In step 538, the support server may access a second application to send the configuration and location of the electronic and/or IT resource 140 to the second or other application, such as security for security updates. In step 580, the support server responds to the second application and sends the required electronic and/or IT resource information to the team or other entity. The, e.g., security management team receives the electronic and/or IT resource 140 information and performs any required work based on the information received. As an example, the contact may require that any changes made to the environment be tracked.

In step 540, the support server invokes the appropriate application to either create a new diagram for the electronic and/or IT resource or update an existing diagram with the new electronic and/or IT resource information. The support server responds to a graphic application and executes instructions to create a new diagram or update an existing diagram such as shown in step 546 based on the electronic and/or IT resource 140 information gathered which, preferably, includes the new or verified electronic and/or IT resource coordinates captured to make the diagram as accurate as possible. The entries are stored into a centralized database, for the creation and/or modification of the 3d CAD mapping of all electronic and/or IT resources 140. In step 550, the support server files the diagrams in an appropriate location for future access and use. The locator device(s) 150 are also labeled and filed as required. The dissemination of the electronic and/or IT resource information is completed at step 590.

FIG. 6 provides the method steps of one method, triangulation, that implements one or more broadcast units 162 to determine the XYZ coordinates of the electronic and/or IT resource. First, the RF/IR broadcast units 162 are placed in predetermined locations, preferably so that there are no obstacles between the broadcast units and electronic and/or IT resources 140 in the secure facility. In step 344, the location coordinates of the broadcast units 162 are stored in the locator device 150. In step 346 of FIG. 6, the locator device 150 receives the requirements including the kinds of data that will be collected from an interrogated electronic and/or IT resource 140 in the facility 108. In step 334, the locator device 150 is inserted into an electronic and/or IT resource 140 and is activated. In step 360, the locator device 150 interrogates the electronic and/or IT resource 140 and uploads the required information that was programmed in step 346. In step 610, the locator device 150 receives a RF signal from a broadcast unit in the secure facility. In step 620, the locator device 150 identifies the signal source and correlates the signal to a particular broadcast unit. The locator device 150 has a receiver that captures the distance from the three broadcast units, and based upon the entered information for those broadcast units, calculates the XYZ spatial coordinates for the electronic and/or IT resource 140 to which the locator device 150 is connected. Alternately, the locator device 150 can capture the distances or signal strengths from the broadcast units and the calculations to determine the XYZ spatial coordinates can be performed by the locator devices or the support server when connected.

When all the broadcast units 162 have been accounted, then in step 624, the processing logic within the locator device 150 using one or more of the following methods: triangulation—for RF/IR or trilateration. In step 628, an infrared laser 260 or other independent measurements may be used to determine or validate the coordinate or value associated with the height from the floor, wall or other independent reference point. In step 630, the configuration of the electronic and/or IT resource 140 and its location are stored in the memory of the locator device 150. In step 634, the locator device 150 is then connected to a support server which verifies the validity of the locator device, and in step 638, the stored information and location of each electronic and/or IT resource 140 are transferred to the support server for inventory or other processing.

Embodiments of the method and apparati disclosed herein address the electronic and/or IT resource management tracking of workstations, servers, etc. In a preferred embodiment, the locator device 150 does not transmit any RF frequencies but is passive so it doesn't interfere with or generate other transmissions in a secure facility. In other facilities, such as a retail storefront or wholesale warehouse, the locator device 150 can receive RF, cell tower transmissions from outside the facility. When activated, the locator device 150 triangulates the XYZ coordinates of its position and may provide the height of the electronic and/or IT resource 140, e.g., the electronic hardware device is a server and is located at grid B2-55, 1.5 meters from the floor. Preferably, the locator device 150 plugs into industry-standard communications ports, such as a USB port, which enable the system, method and apparati disclosed herein to be modular and mobile, not tied down to one system, and not requiring a network connection.

It should be appreciated that the teachings of the present invention could be offered as a business method on a subscription or fee basis. For example, a computer system having the support server and may be created, maintained and/or deployed by a service provider that offers the functions described herein for customers. That is, a service provider could offer to provide the locator device, the broadcast units, and the inventory and change and monitoring processing of the electronic and/or IT resources as described above.

There are advantages of the method disclosed herein to inventory and monitor changes of electronic and/or IT resources and display them in a three-dimensional model. The asset management team can interact with familiar spatial and visual characteristics; multiple personnel can interact together in the virtual environment despite geographic distances. The value to the inventory or asset control schema is the location of each electronic and/or IT resource 140 for quick reference in event of audits, servicing or hardware issues. Audits will be more complete and trust established that the electronic and/or IT resources 140 are appropriately managed. An asset management team will quickly locate electronic and/or IT resources 140 without error caused by mislabeling by referring to schematics. Additionally secure sites will have access to reliable asset management and have a secure data set in which the locator device 150 will be used only when needed. This will have greater accuracy by being in the finer radio range. This locator can also locate end points for fiber, RJ45 network and RJ11 telecommunication cables. Yet, another important advantage is that the gathering of data does not require the electronic and/or IT resource 140 be taken off line or shut down; all information can be passively collected.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information technology tracking system, comprising:
    at least one electronic resource in a localized defined facility, the at least one electronic resource having a first connector;
    more than one broadcasting unit in the localized defined facility, each broadcasting unit having a known and different position and a different frequency from any other broadcasting unit in the localized defined facility;
    a secure device connectible to the first connector of the at least one electronic resource, the secure device further comprising:
        a second connector to transmit and receive data from the at least one electronic resource;
        a receiver to receive wireless signals emitted from the more than one broadcasting unit;
        a nonvolatile memory;
        an optical transmitter/receiver to emit radiation and receive reflected radiation from a reference and store the distance from the secure device to the reference;
        processing logic to determine spatial coordinates of the at least one electronic resource from the wireless signals received by the receiver and the distance between the optical transmitter/receiver and the reference;
    wherein data received from the at least one electronic resource and wireless signals received in the receiver are stored in the memory.

2. The secure device of claim 1, wherein the at least one electronic resource is in a secure facility not receiving emanations from outside the secure facility.

3. A secure device comprising:
a connector to transmit and receive data from an electronic resource;
a receiver to receive wireless signals;
a nonvolatile memory;
an optical transmitter and receiver to emit radiation and receive reflected radiation from a reference and store the position of the secure device with respect to the reference;
wherein data is received from the electronic resource and wireless signals received in the receiver are stored in the memory.

4. A secure device comprising:
a connector to transmit and receive data from an electronic resource;
a receiver to receive wireless signals;
a nonvolatile memory;
a gyroscopic level;
wherein data is received from the electronic resource and wireless signals received in the receiver are stored in the memory.

5. A method to receive information from one or more information technology resources in a localized defined facility, comprising:
inserting a locator device into an electronic data connector of the one or more information technology resources;
activating the locator device;
the locator device interrogating and receiving data from the one or more information technology resources;
transmitting wireless signals from at least two different transmitters in the localized and defined facility, each transmitter transmitting a different frequency;
for each of the one or more information technology resources, the locator device receiving wireless signals from the at least two different transmitters in the localized and defined facility of the one or more information technology resources;
emitting and receiving reflected radiation from a radiation source in the locator device to and from a reference in the facility;
processing the wireless signals and a distance from the reference to the locator device to determine spatial coordinates of each of the one or more information technology resources;
the locator device storing the data received from the one or more information technology resources in a nonvolatile memory in the locator device.

6. The method of claim 5, further comprising:
the locator device storing the spatial coordinates of each of the one or more information technology resources in the nonvolatile memory.

7. The method of claim 5, further comprising:
the locator device storing the wireless signals in the nonvolatile memory.

8. The method of claim 5, wherein the data received from the one or more information technology resources comprises one or more of the following: name, serial number, type of information technology resource, cost, price, depreciation, firmware, basic input output system data, internet protocol, IP address, install software configuration, intranet protocol.

9. The method of claim 5 wherein the one or more information technology resources are in a secure TEMPEST facility that does not receive transient and compromising transmissions and emanations and signals from outside the secure TEMPEST facility.

10. The method of claim 5, further comprising:
processing the wireless signals and the distance from the reference to the locator device to determine spatial coordinators of the one or more information technology resources in the locator device.

11. The method of claim 5, further comprising:
generating/updating a database of the one or more information technology resources.

12. The method of claim 5, further comprising:
generating/updating physical diagrams of the location of the one or more information technology resources.

13. The method of claim 5, further comprising:
updating service level agreements of the one or more information technology resources.

14. The method of claim 5, further comprising:
conducting an inventory of the one or more information technology resources.

15. The method of claim 5, further comprising:
recording an install, move, add, change event on one or more of the information technology resources.

16. The method of claim 5, further comprising:
locating a lost or misidentified information technology resource.

17. A method to receive information from one or more information technology resources, comprising:
inserting a locator device into an electronic data connector of the one or more information technology resources;
activating the locator device;
the locator device interrogating and receiving data from the one or more information technology resources;
for each of the one or more information technology resources, the locator device receiving wireless signals from at least two different transmitters in the facility of the one or more information technology resources;
the locator device emitting a beam to a reference;
the locator device receiving a reflection of the beam from the reference;
for each of the one or more information technology resources, processing logic within the locator device calculating a distance from the locator device to the reference;
the locator device storing the distance of each of the one or more information technology resources in the nonvolatile memory.

18. A method to receive information from one or more information technology resources, comprising:
inserting a locator device into an electronic data connector of the one or more information technology resources;
activating the locator device;
the locator device interrogating and receiving data from the one or more information technology resources;
for each of the one or more information technology resources, the locator device receiving wireless signals from at least two different transmitters in the facility of the one or more information technology resources;
the locator device storing the data received from the one or more information technology resources in a nonvolatile memory in the locator device;
removing the locator device from the one or more information technology resources;
connecting the locator device to a computer;
downloading the information technology resource data and the stored wireless signals for each of the one or more information technology resources to the computer;
the computer performing at least one of the following:
calculating the spatial coordinates of each of the one or more information technology resources;

creating/updating an asset database with the information technology resource data and its respective spatial coordinates;

creating/updating physical diagrams of a facility in which the information technology resource is located;

creating/updating information associated with use of the one or more information technology resources.

19. A computer program product for receiving information technology asset data and location data of an information technology asset in a defined localized facility, the computer program product comprising a tangible computer readable storage memory having computer readable program code embodied therewith, the computer readable program code comprising:

first program instructions to receive predetermined information from an information technology resource and store the predetermined information in a nonvolatile memory;

second program instructions to receive wireless signals from more than one wireless transmitters in the defined localized facility in which the information technology resource is located, each transmitter transmitting a different frequency;

third program instructions to transmit radiation to and receive reflected radiation from a reference within the defined localized facility;

fourth program instructions to calculate the position of the information technology resource in the defined localized facility from the wireless signals and the reflected radiation;

fifth program instructions to transmit the predetermined information and the calculated position of the information technology resource to one or more computer program applications.

20. The computer program product of claim 19, further comprising:

sixth program instructions to create/update a database of one or more of the information technology resources in the defined localized facility.

21. The computer program product of claim 19, further comprising:

seventh program instructions to create/update physical diagrams of the defined localized facility indicating the location of one or more of the information technology resources in the defined localized facility.

22. The computer program product of claim 19, further comprising:

eighth computer program instructions to update and manage service level agreements of one or more of the information technology resources in the defined localized facility.

* * * * *